US011978451B2

(12) United States Patent
Dewan et al.

(10) Patent No.: US 11,978,451 B2
(45) Date of Patent: *May 7, 2024

(54) SYSTEMS AND METHODS TO TRANSLATE A SPOKEN COMMAND TO A SELECTION SEQUENCE

(71) Applicant: Suki AI, Inc., Redwood City, CA (US)

(72) Inventors: Maneesh Dewan, Sunnyvale, CA (US); Jatin Chhugani, Mountain View, CA (US); Ganesh Satish Mallya, Santa Clara, CA (US); Alan Diec, Sunnyvale, CA (US); Vamsi Reddy Chagari, Milpitas, CA (US); Sudheer Tumu, Santa Clara, CA (US); Nithyanand Kota, Santa Clara, CA (US)

(73) Assignee: Suki AI, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/989,449

(22) Filed: Nov. 17, 2022

(65) Prior Publication Data
US 2023/0072655 A1 Mar. 9, 2023

Related U.S. Application Data

(63) Continuation of application No. 17/221,603, filed on Apr. 2, 2021, now Pat. No. 11,508,373.

(51) Int. Cl.
G10L 15/00 (2013.01)
G06F 3/04842 (2022.01)
(Continued)

(52) U.S. Cl.
CPC .......... *G10L 15/22* (2013.01); *G06F 3/04842* (2013.01); *G10L 15/02* (2013.01);
(Continued)

(58) Field of Classification Search
CPC ......... G10L 15/07; G10L 15/20; G10L 15/22; G10L 15/26; G10L 15/30; G10L 15/02;
(Continued)

(56) References Cited

U.S. PATENT DOCUMENTS 11,508,373 B1 * 11/2022 Dewan .................. G06F 3/0482
2009/0172546 A1    7/2009 Chang
2020/0293167 A1    9/2020 Blyumen

* cited by examiner

Primary Examiner — Vu B Hang
(74) Attorney, Agent, or Firm — Esplin & Associates, PC

(57) ABSTRACT

Systems and methods to translate a spoken command to a selection sequence are disclosed. Exemplary implementations may: obtain audio information representing sounds captured by a client computing platform; analyze the sounds to determine spoken terms; determine whether the spoken terms include one or more of the terms that are correlated with the commands; responsive to determining that the spoken terms are terms that are correlated with a particular command stored in the electronic storage, perform a set of operations that correspond to the particular command; responsive to determine that the spoken terms are not the terms correlated with the commands stored in the electronic storage, determining a selection sequence that causes a result subsequent to the analysis of the sounds; correlate the spoken terms with the selection sequence; store the correlation of the spoken terms with the selection sequence; and perform the selection sequence to cause the result.

14 Claims, 5 Drawing Sheets

(51) Int. Cl.
  *G10L 15/02*      (2006.01)
  *G10L 15/22*      (2006.01)
  G10L 15/06        (2013.01)
  G10L 15/08        (2006.01)

(52) U.S. Cl.
  CPC ............ *G10L 15/063* (2013.01); *G10L 15/08* (2013.01); *G10L 2015/221* (2013.01); *G10L 2015/225* (2013.01)

(58) Field of Classification Search
  CPC ....... G10L 15/063; G10L 15/08; G10L 15/00; G10L 15/10; G10L 15/1822; G10L 15/183; G10L 15/19; G10L 15/193; G06F 16/685; G06F 3/16; H04M 2201/40
  See application file for complete search history.

SYSTEMS AND METHODS TO TRANSLATE A SPOKEN COMMAND TO A SELECTION SEQUENCE

FIELD OF THE DISCLOSURE

The present disclosure relates to systems and methods to translate a spoken command to a selection sequence.

BACKGROUND

Determining a result to cause in response to a command spoken by a user may be a known technique to execute spoken commands. However, such technique limits how many spoken commands are executable by the user to merely commands that are contemplated and stored.

SUMMARY

One aspect of the present disclosure relates to a system configured to translate a spoken command to a selection sequence. The system may include one or more hardware processors configured by machine-readable instructions, electronic storage, and/or other components. Machine-readable instructions may include one or more instruction components. The instruction components may include computer program components. The instruction components may include one or more of analysis component, term determination component, performance component, selection sequence determination component, correlation component, user interface element determination component, and/or other instruction components. The electronic storage may be configured to store correlations between commands and terms and/or other information. The commands may correspond to sets of operations to cause results.

The analysis component may be configured to obtain audio information representing sounds captured by a client computing platform. The client computing platform may present a user interface including user interface elements that facilitate selection and/or entry of input. The analysis component may be configured to analyze the sounds to determine spoken terms.

The term determination component may be configured to determine whether the spoken terms include one or more of the terms that are correlated with the commands.

The performance component may be configured to perform a set of operations that correspond to the particular command. Performance of the set of operations may be responsive to determining that the spoken terms include terms that are correlated with a particular command stored in the electronic storage.

The selection sequence determination component may be configured to determining a selection sequence that causes a result subsequent to the analysis of the sounds. Determining the selection sequence may be responsive to determine that the spoken terms do not include the terms correlated with the commands stored in the electronic storage. The selection sequence may include selections of the user interface elements required to cause the result. By way of non-limiting illustration, the selection sequence includes selection of a first user interface element, followed by selection of second user interface element and followed by selection of third user interface element to execute the command. The user interface elements may include the first user interface element, the second user interface element, and the third user interface element, and/or other user interface elements.

The correlation component may be configured to correlate the spoken terms with the selection sequence. The correlation component may be configured to store the correlation of the spoken terms with the selection sequence to the electronic storage.

The performance component may be configured to perform the selection sequence to cause the result.

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
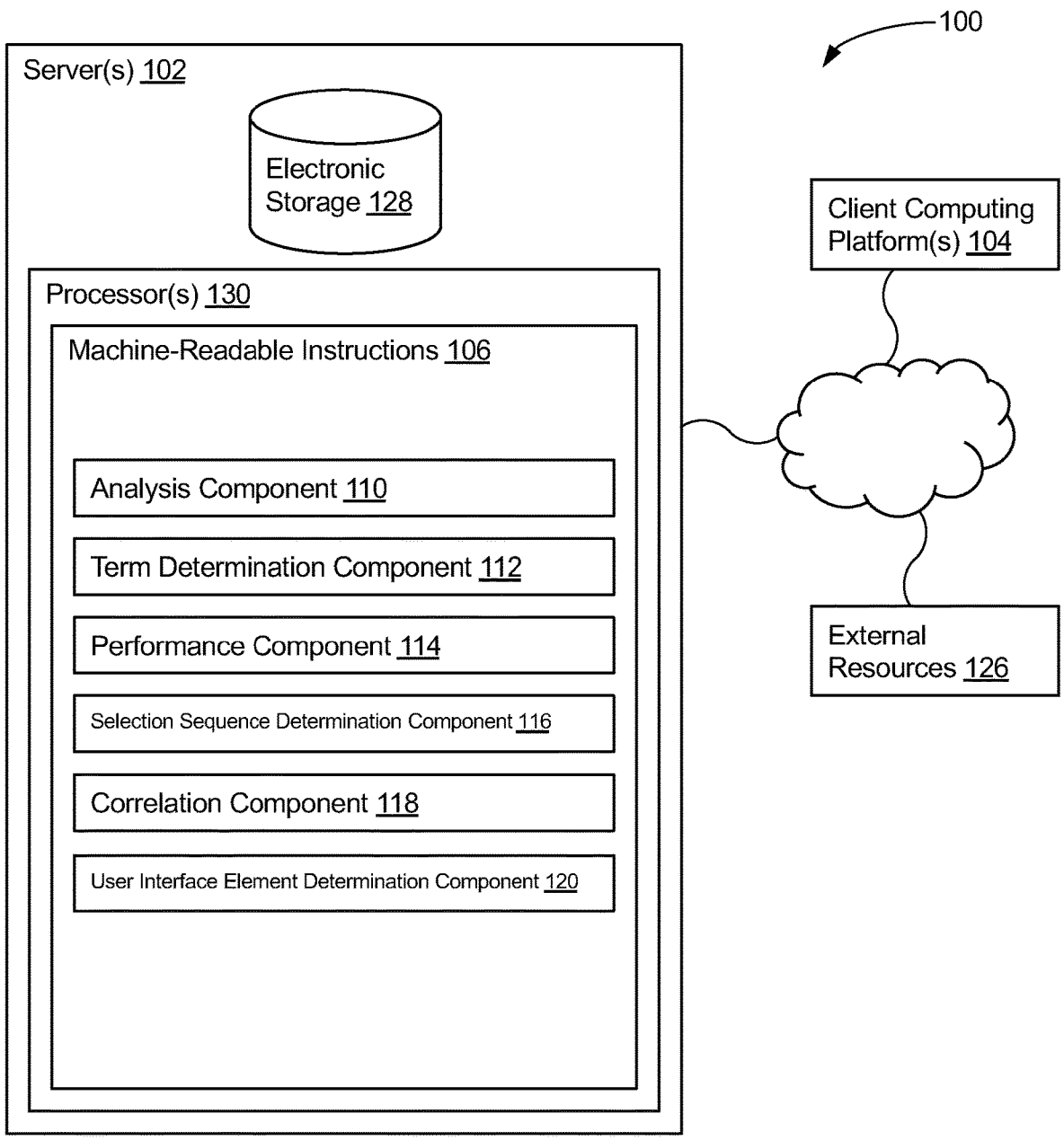
FIG. 1 illustrates a system configured to translate a spoken command to a selection sequence, in accordance with one or more implementations.

FIG. 1 illustrates a system 100 configured to translate a spoken command to a selection sequence, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Individual client computing platforms 104 may be associated with individual users. For example, users may include a doctor, a nurse, a physician, an authorized medical personnel, a clinician, a caregiver, and/or other users. Client computing platform 104 may present a user interface including user interface elements that facilitate selection and/or entry of input. The user interface elements may be configured to facilitate user interaction with the user interface, user entry, and/or selection. By way of non-limiting illustration, the user interface elements may include one or more of text input fields, drop down menus, check boxes, display windows, virtual buttons, and/or other user interface elements. The user interface elements may include contextual user interface elements, variable user interface elements, and/or other user interface elements. The contextual user interface elements may be general to the user interface and its context (e.g., a medical context). By way of non-limiting example, the contextual user interface elements may include at least a search button, a calendar button, an open button, a save button, a delete button, an edit button, close buttons, and/or other contextual user interface elements. Selection of the search button may cause a search based on user entry (e.g., of a patient name, of a date, of a drug, etc.). Selection of the calendar button may open a calendar or schedule of the user. Selection of the open button may open a corresponding file, note, appointment, or other electronic items relevant to the context. Selection of the save button may save changes made to the file, the note, the appointment, or other electronic items. Selection of the delete button may delete the corresponding file, note, or other electronic items. Selection of the edit button may cause presentation of editing features or otherwise enable editing for the file, the note, or other electronic items. The variable user interface elements may be selected to enter input or values. By way of non-limiting example, variable user interface elements may include virtual keys of a virtual keyboard, virtual keys of a virtual keypad, a virtual calendar for entry/selection of a date, and/or other variable user interface elements.

Electronic storage 128 may be configured to store correlations between commands and terms, and/or other information. The commands may correspond to sets of operations to cause results. A set of operations may include a selection sequence, speech recognition performance, retrieval of particular information (e.g., a note for a patient) based on the speech recognition, determining correlations, determining correlated based on the speech recognition, and/or other operations that cause results. A result may refer to an outcome requested and spoken by the user (e.g., one of the commands). By way of non-limiting illustration, a result may be presentation of a particular note for a particular patient, modifications to a particular note, modifications to an appointment, or other results. Results described herein are for illustrative purposes and are not intended to be limiting. By way of non-limiting illustration, electronic storage 128 may store a first correlation between a first command and a first term and other terms. The first command may correspond a first set of operations to cause a first result.

In some implementations, electronic storage 128 may be configured to store keywords associated with the contextual user interface elements. The keywords may identify the contextual user interface elements. For example, a keyword "search" may be associated with the search button, keywords "appointment" and "calendar" may be associated with the calendar button, a keyword "open" may be associated with the open button, keywords "close" or "exit" may be associated with the close button, keywords "delete" and "remove" may be associated with the delete button, keywords "edit", "change", and modify may be associated with the edit button, keywords "save" and "keep" may be associated with the save button, and other keyword contextual user interface elements are contemplated.

Server(s) 102 may be configured by machine-readable instructions 106. Machine-readable instructions 106 may include one or more instruction components. The instruction components may include computer program components. The instruction components may include one or more of analysis component 110, term determination component 112, performance component 114, selection sequence determination component 116, correlation component 118, user interface element determination component 120, and/or other instruction components.

Analysis component 110 may be configured to obtain audio information representing sounds captured by client computing platforms 104. Analysis component 110 may be configured to analyze the sounds to determine spoken terms. The spoken terms may be terms that the user has spoken, and thus have been captured and represented as the audio information. At least some of the spoken terms uttered by the user may comprise a command that causes a result. For example, a first set of sounds captured may be (e.g., "Open John's last appointment note") uttered by a first user and represented by first audio information obtained by analysis component 110. The first set of sounds may include a first set of spoken terms (e.g., the first term and a second term spoken by the first user).

In some implementations, the spoken terms may include variable terms. The variable terms may be terms uttered by the users that may vary upon different users uttering variations of the same sounds and thus the same command. For example, the first set of spoken terms may further include a first variable term. A second set of sounds uttered by a second user may be captured and represented by second audio information (e.g., "Open Jane's last appointment note"). The second set of sounds may include a second set of spoken terms (e.g., the first term, the second term, and a second variable term). The terms determined in the first set of sounds and the second set of sounds may correspond to the same first set of operations to cause a similar result (i.e., are the same first command), and the variable terms (e.g., the first variable term and the second variable term, or John and Jane, respectively) may be the difference.

In some implementations, analysis component 110 may configured to analyze the sounds to determine the variable terms. In some implementations, the spoken terms may be determined, and the variable terms may be subsequently determined from the spoken terms. In some implementations, analyzing the sounds may include performing speech recognition and/or other known techniques for determining spoken terms and variable terms.

Term determination component 112 may be configured to determine whether the spoken terms include one or more of the terms that are correlated with the commands. That is, for example, the first set of spoken terms may be determined to include the first term which is correlated with the first command (and is stored as the first correlation). In some implementations, term determination component 112 may be configured to determine which of the terms correlated with the commands are included in the spoken terms. Such determination may facilitate determining whether one of the correlations stored to electronic storage 128 is useful to determine a particular set of operations to perform and cause results for the users. In some implementations, term determination component 112 may determine an amount of terms correlated with an individual command that the spoken terms include. Based on the determination of which of the correlated terms are included in the spoken terms and/or the spoken terms including a particular amount of terms correlated with the individual command, a set of operations corresponding to the individual command may be determined or otherwise obtained from electronic storage 128.

Performance component 114 may be configured to perform a set of operations that correspond to a particular command. The performance of the set of operations may be responsive to determining that the spoken terms include terms that are correlated with the particular command stored in electronic storage 128. In some implementations, the performance of the set of operations may be responsive to the determination of which of the correlated terms are included in the spoken terms and/or the spoken terms including the particular amount of terms correlated with the particular command. For example, responsive to determining that the first set of spoken terms includes the first term which is correlated with the first command, the first set of operations (that corresponds to the first command) may be performed to cause the first result. Thus, the correlations stored in electronic storage 128 may be utilized to perform set of operations to cause results.

Selection sequence determination component 116 may be configured to determining a selection sequence that causes a result subsequent to the analysis of the sounds. The determination of the selection sequence may be responsive to determining that the spoken terms do not include the terms correlated with the commands stored in electronic storage 128. Meaning, electronic storage 128 may not store a correlation between the spoken terms and a command. The selection sequence may include selections of the user interface elements required to cause the result. By way of non-limiting illustration, the selection sequence may include selection of a first user interface element, followed by selection of second user interface element, followed by selection of third user interface element to execute the command, and followed by other selections to other user interface elements. The user interface elements may include the first user interface element, the second user interface element, the third user interface element, and other user interface elements. In some implementations, the selection sequence may include virtual keystrokes required to execute the command. The virtual keystrokes may include selections to the variable user interface elements (i.e., the virtual keys of the virtual keyboard and/or the virtual keypad).

By way of non-limiting illustration, a third set of sounds may be captured and uttered by the first user (and represented as obtained third audio information). The third set of sounds may be determined to include a third set of spoken terms (e.g., a third term and a fourth term spoken by the first user). Term determination component 112 may determine that none of the terms stored in electronic storage 128 and correlated with commands include the third term and the fourth term (i.e., electronic storage 128 does not store a correlation between (a) the third term and the fourth term and (b) an individual command that corresponds with a set of operations to cause a result). In response, the selection sequence may be determined.

Correlation component 118 may be configured to correlate the spoken terms with the selection sequence. The correlation of the spoken terms with the selection sequence may be subsequent to the determination of the selection sequence. By way of non-limiting illustration, the third set of spoken terms may be correlated with the selection sequence. In some implementations, correlating the spoken terms with the selection sequence and storing the correlation may be responsive to obtaining the same audio information or similar audio information to the audio information a particular amount of times. That is, upon determination of the same selection sequence subsequent to obtainment of the same or similar audio information 50 times, for example, the selection sequence and the spoken terms determined from the sounds represented by that audio information may be correlated. The particular amount of times may be defined by the user, an administrator of system 100, or other user. The particular amount may be a percentage, a specific number, or other amount. Correlation component 118 may be configured to store the correlation of the spoken terms with the selection sequence to electronic storage 128 subsequent to correlating.

Performance component 114 may be configured to perform the selection sequence to cause the result. In some implementations, performance of the selection sequence may occur contemporaneously as determination of the selection sequence. Meaning, as the user is selecting the user interface elements required to cause the result, selection sequence determination component 116 may be determining the selection sequence. Determination of the selection sequence by selection sequence determination component 116 may include recording the selection sequence and/or other determination techniques.

In some implementations, user interface element determination component 120 may be configured to determine particular ones of the contextual user interface elements required to cause the result. In some implementations, determining the selection sequence may include such determination. In some implementations, analysis component 110 may be configured to analyze the sounds to determine presence of the keywords. Upon determination of presences of the keywords in the sounds, user interface element determination component 120 may be configured to determine the particular contextual user interface elements required for the command based on such analysis.

In some implementations, user interface element determination component 120 may be configured to determine particular ones of the variable user interface elements required to input the variable terms. Thus, the selection sequence determined by selection sequence determination component 116 may include selections of the particular contextual user interface elements and selections of the particular variable user interface elements. The variable user interface elements may vary upon different ones of the variable terms determined in separate audio information representing similar sounds (e.g., the first set of sounds and the second set of sounds) and may therefore be interchangeable based on the separate audio information representing the similar but different sounds. Such selection sequence may be stored to electronic storage 128. As such, in some implementations, performing the selection sequence may include executing the selections of the contextual interface elements and the virtual keystrokes as the variable user interface elements. By way of non-limiting illustration, the selections of the particular contextual user interface elements may include selection of the open button and of the edit button and the selections of the particular variable user interface elements may include the virtual keystrokes (e.g., of "John" as a nickname). The selections of the variable user interface elements, or the virtual keystrokes, may be interchangeable for other virtual keystrokes (e.g., of "Kim" as a nickname).

Figure 3A:
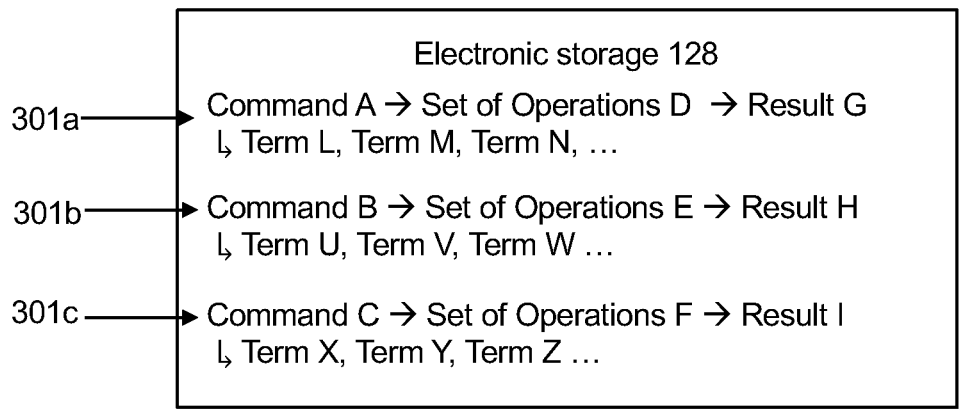
FIG. 3A-C illustrate example implementations, in accordance with one or more implementations.
Figure 3A:
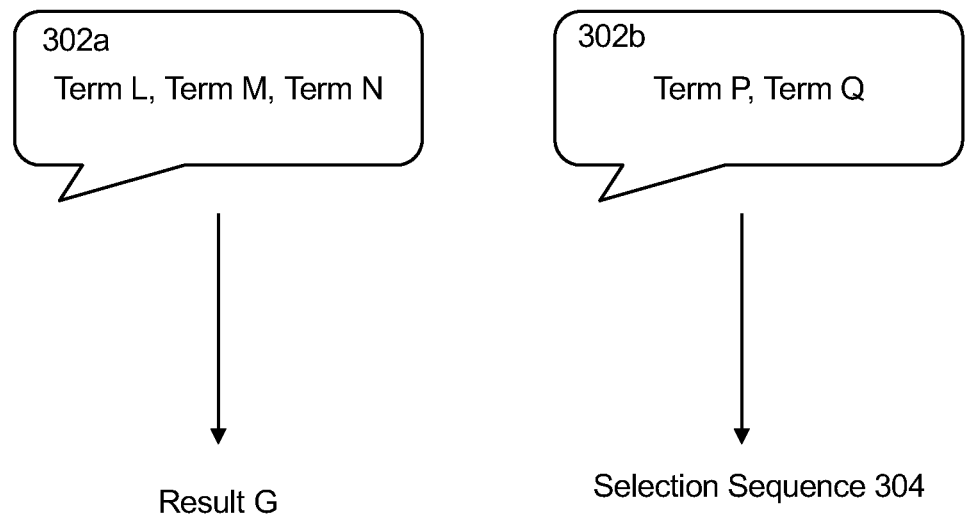
Figure 3B:
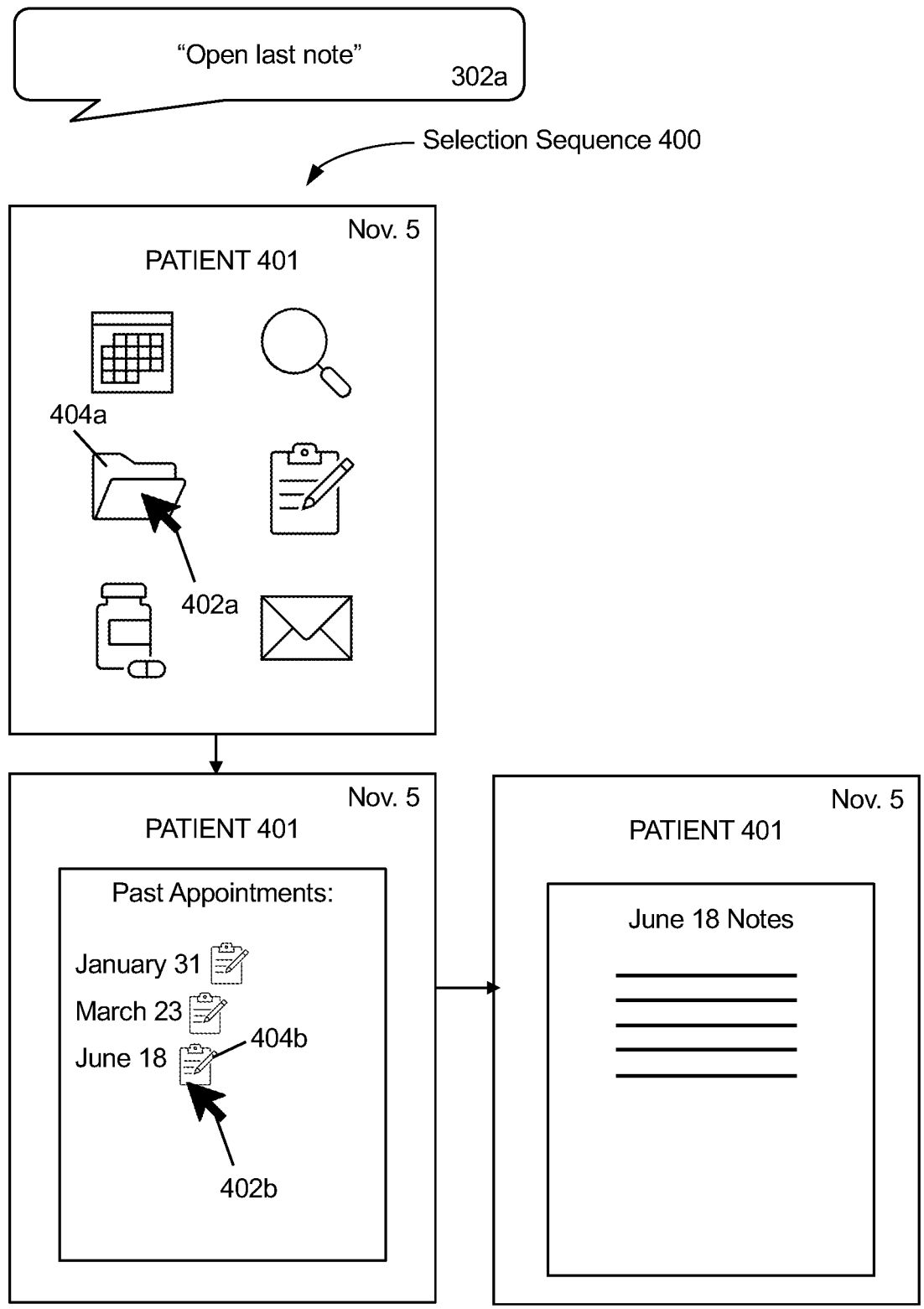
Figure 3C:
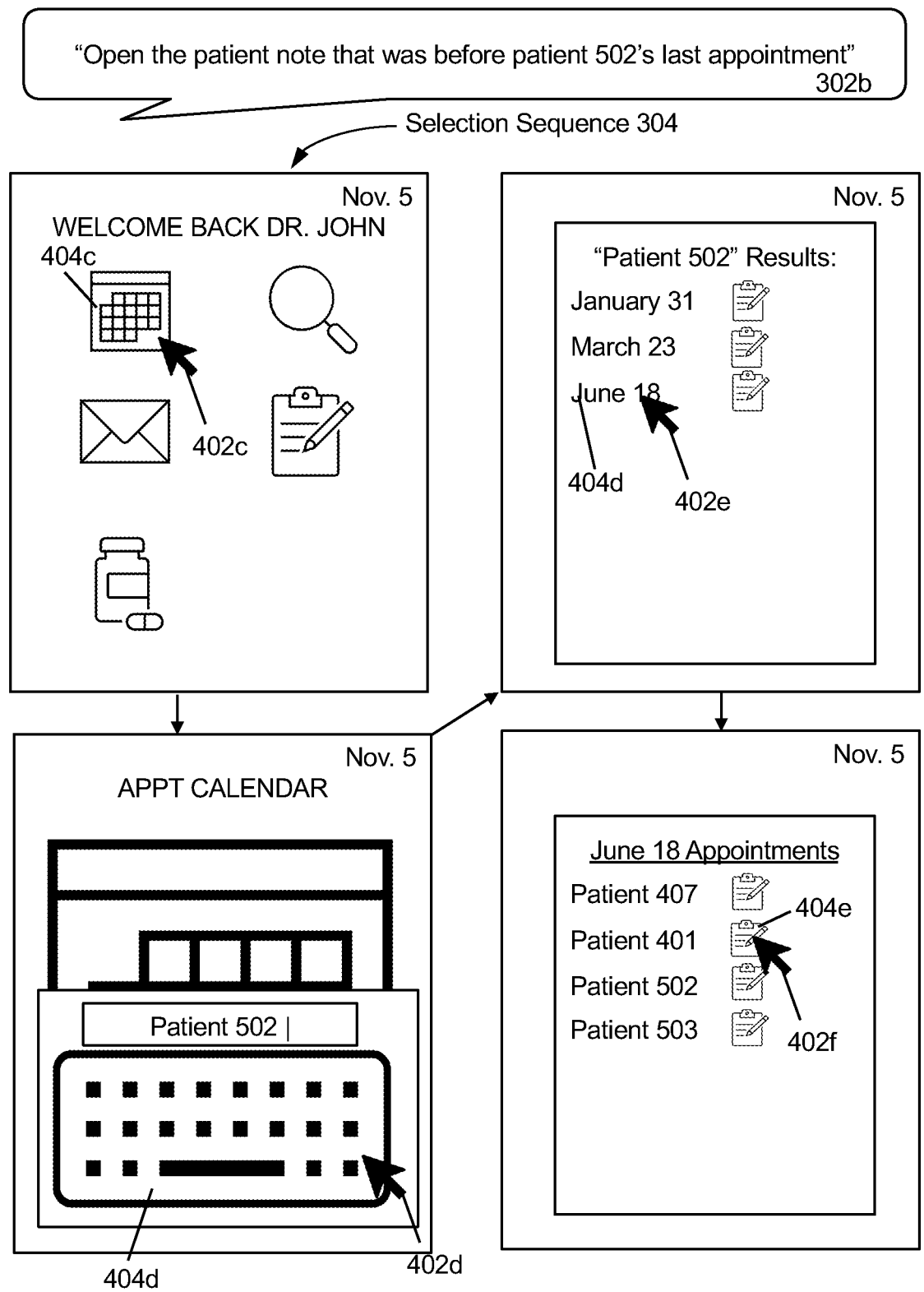

FIG. 3A-C illustrates an example implementation, in accordance with one or more implementations. FIG. 3A may illustrate electronic storage 128 (the same from FIG. 1). Electronic storage 128 may store correlations 301a-c. Correlation 301a may correlate terms L, N, and M with command A. Command A may correspond to set of operations D that causes result G. Correlation 301b may correlate terms U, V, and W with command B. Command B may correspond to set of operations E that causes result H. Correlation 301c may correlate terms X, Y, and Z with command C. Command C may correspond to set of operations F that causes result I. Upon a user uttering Terms L, M, and N and system 100 of FIG. 1 obtaining audio information 302*a*, system 100 may determine such terms and determine that such terms are correlated with a command, command A, stored in electronic storage 128. Thus, system 100 may perform set of operations D to cause result G. Upon the user uttering terms P and Q and system 100 obtaining audio information 302*b*, system 100 may determine such terms and determine that electronic storage 128 does not include nor store a correlation with terms P and Q. Thus, a selection sequence 304 may be determined.

FIG. 3B illustrates an example related to FIG. 3A. Audio information 302*a* representing "Open last note" (and therefore terms L, M, and N) may cause performance of selection sequence 400 (i.e., set of operations D) to cause result G. Selection sequence 400 may include a selection 402*a* of user interface element 404*a* (e.g., an open folder button) that may open past appointments of a patient 401. Subsequently, selection 402*b* of user interface element 404*b* (e.g., a note button) may open the last note (e.g., June 18 Notes) of patient 401.

FIG. 3C illustrates an example related to FIG. 3A. Audio information 302*b* representing "Open the patient note that was before patient 502's last appointment" (and therefore terms P and Q) may cause performance of selection sequence 304. Selection sequence 304 may include selection 402*c* of contextual user interface element 404*c* (e.g., a calendar button), selection 402*d* of variable user interface elements 404*d* (e.g., virtual keystrokes of virtual keys for "Patient 502"), selection 402*e* of user interface element 404*d* (e.g., the last appointment date of patient 502, June 18), and selection 402*f* of user interface element 404*e* (e.g., note button corresponding to the patient prior to patient 502, patient 402). System 100 may determine and store selection sequence 304 to electronic storage 128.

In some implementations, server(s) 102, client computing platform(s) 104, and/or external resources 126 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform 104 may include one or more processors configured to execute computer program components. The computer program components may be configured to enable an expert or user associated with the given client computing platform 104 to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 126 may include sources of information outside of system 100, external entities participating with system 100, and/or other resources. In some implementations, some or all of the functionality attributed herein to external resources 126 may be provided by resources included in system 100.

Server(s) 102 may include electronic storage 128, one or more processors 130, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 110, 112, 114, 116, 118, and/or 120, and/or other components. Processor(s) 130 may be configured to execute components 110, 112, 114, 116, 118, and/or 120, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 110, 112, 114, 116, 118, and/or 120 are illustrated in FIG. 1 as being implemented within a single processing unit, in implementations in which processor(s) 130 includes multiple processing units, one or more of components 110, 112, 114, 116, 118, and/or 120 may be implemented remotely from the other components. The description of the functionality provided by the different components 110, 112, 114, 116, 118, and/or 120 described below is for illustrative purposes, and is not intended to be limiting, as any of components 110, 112, 114, 116, 118, and/or 120 may provide more or less functionality than is described. For example, one or more of components 110, 112, 114, 116, 118, and/or 120 may be eliminated, and some or all of its functionality may be provided by other ones of components 110, 112, 114, 116, 118, and/or 120. As another example, processor(s) 130 may be configured to execute one or more additional components that may perform some or all of the functionality attributed below to one of components 110, 112, 114, 116, 118, and/or 120.

Figure 2:
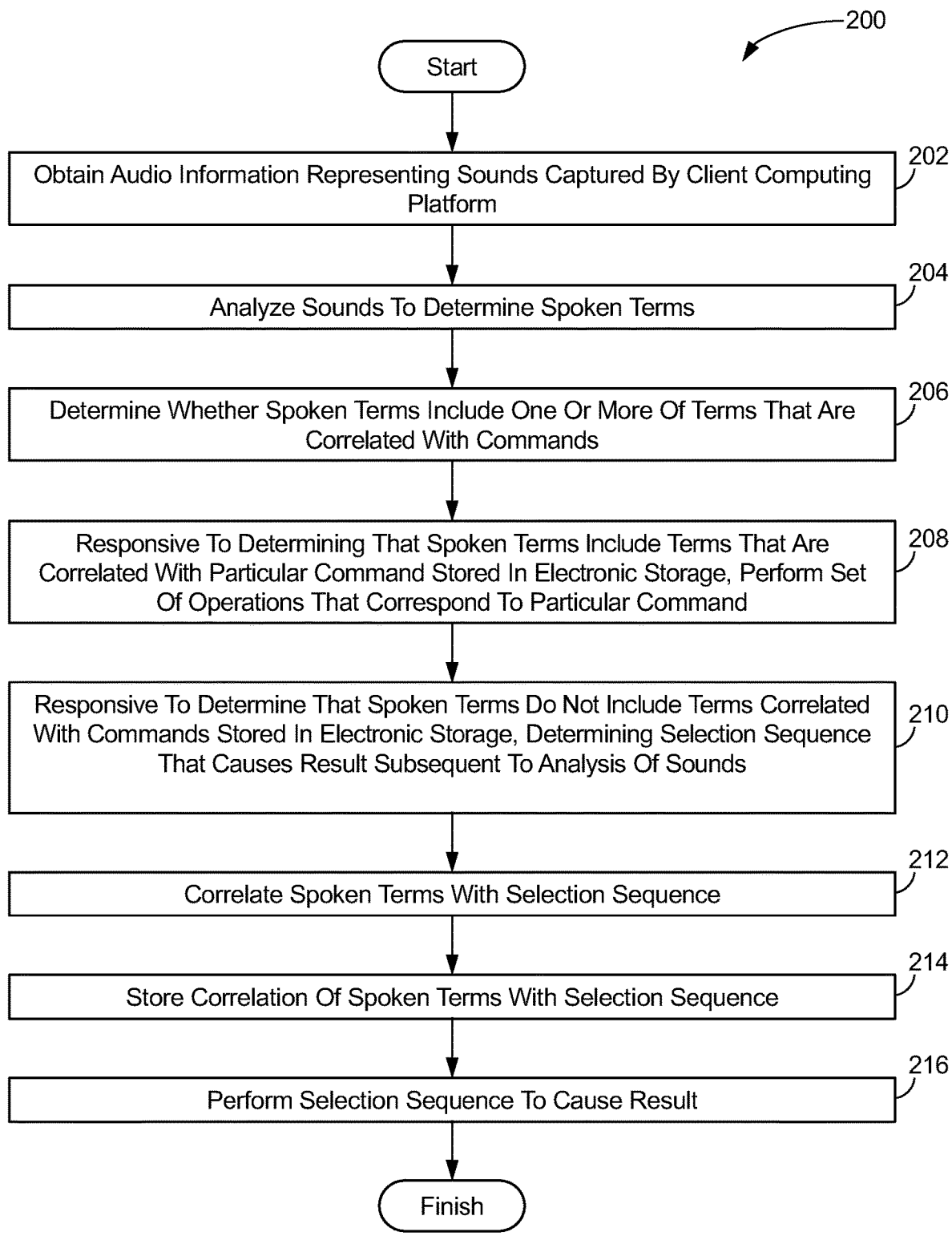
FIG. 2 illustrates a method to translate a spoken command to a selection sequence, in accordance with one or more implementations.

FIG. 2 illustrates a method 200 to translate a spoken command to a selection sequence, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include obtaining audio information representing sounds captured by a client computing platform. The client computing platform may present a user interface including user interface elements that facilitate selection and/or entry of input. Operation 202 may be performed by one or more hardware processors configured by machine-readable instructions including a component that is the same as or similar to analysis component 110, in accordance with one or more implementations.

An operation 204 may include analyzing the sounds to determine spoken terms. Operation 204 may be performed by one or more hardware processors configured by machine-readable instructions including a component that is the same as or similar to analysis component 110, in accordance with one or more implementations.

An operation 206 may include determining whether the spoken terms include one or more of the terms that are correlated with the commands. Operation 206 may be performed by one or more hardware processors configured by machine-readable instructions including a component that is the same as or similar to term determination component 112, in accordance with one or more implementations.

An operation 208 may include responsive to determining that the spoken terms include terms that are correlated with a particular command stored in the electronic storage, performing a set of operations that correspond to the particular command. Operation 208 may be performed by one or more hardware processors configured by machine-readable instructions including a component that is the same as or similar to performance component 114, in accordance with one or more implementations.

An operation 210 may include responsive to determining that the spoken terms do not include the terms correlated with the commands stored in the electronic storage, determining a selection sequence that causes a result subsequent to the analysis of the sounds. The selection sequence may include selections of the user interface elements required to cause the result such that the selection sequence includes selection of a first user interface element, followed by selection of second user interface element and followed by selection of third user interface element to execute the command. The user interface elements may include the first user interface element, the second user interface element, and the third user interface element. Operation 210 may be performed by one or more hardware processors configured by machine-readable instructions including a component that is the same as or similar to selection sequence determination component 116, in accordance with one or more implementations.

An operation 212 may include correlating the spoken terms with the selection sequence. Operation 212 may be performed by one or more hardware processors configured by machine-readable instructions including a component that is the same as or similar to correlation component 118, in accordance with one or more implementations.

An operation 214 may include storing the correlation of the spoken terms with the selection sequence. Operation 214 may be performed by one or more hardware processors configured by machine-readable instructions including a component that is the same as or similar to correlation component 118, in accordance with one or more implementations.

An operation 216 may include performing the selection sequence to cause the result. Operation 216 may be performed by one or more hardware processors configured by machine-readable instructions including a component that is the same as or similar to performance component 114, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to translate a spoken command to a selection sequence, the system comprising:
an electronic storage configured to store correlations between commands and terms, wherein the commands correspond to sets of operations to cause results;
one or more processors configured by machine-readable instructions to:
obtain audio information captured by a client computing platform that conveys spoken terms;
determine whether the spoken terms include one or more of the terms that are correlated with the commands;
responsive to determining that the spoken terms include terms that are correlated with a particular command stored in the electronic storage, perform a set of operations that correspond to the particular command;

responsive to determining that the spoken terms do not include the terms correlated with the commands stored in the electronic storage, determine a selection sequence that causes a result subsequent to the analysis of the sounds, wherein the selection sequence include selections and/or entries via the client computing platform required to cause the result;

correlate the spoken terms with the selection sequence;

store the correlation of the spoken terms with the selection sequence to the electronic storage; and perform the selection sequence to cause the result.

2. The system of claim 1, wherein correlating the spoken terms with the selection sequence and storing the correlation is responsive to obtaining the same audio information or similar audio information to the audio information a particular amount of times.

3. The system of claim 1, wherein the selection sequence includes virtual keystrokes required to execute the command.

4. The system of claim 1, wherein the spoken terms include variable terms, wherein the one or more processors are further configured by the machine-readable instructions to:

determine particular ones of the selections that are contextual and required to cause the result; and determine particular ones of the selections that are variable and required to input the variable terms, such that the selection sequence includes contextual selections and variable selections.

5. The system of claim 4, wherein performing the selection sequence includes executing the contextual selections and virtual keystrokes as the variable selections, wherein the virtual keystrokes input the variable terms.

6. The system of claim 4, wherein the contextual selections include selections of at least a search button, a calendar button, an open button, a save button, a delete button, an edit button, and/or close buttons.

7. The system of claim 4, wherein electronic storage is configured to store keywords associated with the contextual selections, wherein the one or more processors are further configured by the machine-readable instructions to:

determine whether the spoken terms include the keywords; and determine the particular contextual selections required for the command based on the determination.

8. A method to translate a spoken command to a selection sequence, the method comprising:

obtaining audio information captured by a client computing platform that conveys spoken terms;

determining whether the spoken terms include one or more terms that are correlated with commands and stored in electronic storage, wherein the electronic storage is configured to store correlations between the commands and terms, wherein the commands correspond to sets of operations to cause results;

responsive to determining that the spoken terms include terms that are correlated with a particular command stored in the electronic storage, performing a set of operations that correspond to the particular command;

responsive to determining that the spoken terms do not include the terms correlated with the commands stored in the electronic storage, determining a selection sequence that causes a result subsequent to the analysis of the sounds, wherein the selection sequence include selections and/or entries via the client computing platform required to cause the result;

correlating the spoken terms with the selection sequence;

storing the correlation of the spoken terms with the selection sequence to the electronic storage; and performing the selection sequence to cause the result.

9. The method of claim 8, wherein correlating the spoken terms with the selection sequence and storing the correlation is responsive to obtaining the same audio information or similar audio information to the audio information a particular amount of times.

10. The method of claim 8, wherein the selection sequence includes virtual keystrokes required to execute the command.

11. The method of claim 8, wherein the spoken terms include variable terms, further comprising:

determining particular ones of the selections that are contextual and required to cause the result; and determining particular ones of the selections that are variable and required to input the variable terms, such that the selection sequence includes contextual selections and variable selections.

12. The method of claim 11, wherein performing the selection sequence includes executing the contextual selections and virtual keystrokes as the variable selections, wherein the virtual keystrokes input the variable terms.

13. The method of claim 11, wherein the contextual selections include selections of at least a search button, a calendar button, an open button, a save button, a delete button, an edit button, and/or close buttons.

14. The method of claim 11, wherein electronic storage is configured to store keywords associated with the contextual selections, further comprising:

determine whether the spoken terms include the keywords; and determining the particular contextual selections required for the command based on the determination.

* * * * *